United States Patent
Garhart

(10) Patent No.: US 10,322,552 B2
(45) Date of Patent: Jun. 18, 2019

(54) COMPOSITE REPAIR ARMATURE

(71) Applicant: Sikorsky Aircraft Corporation, Stratford, CT (US)

(72) Inventor: Jonathan K. Garhart, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 117 days.

(21) Appl. No.: 15/544,402

(22) PCT Filed: Jan. 18, 2016

(86) PCT No.: PCT/US2016/013791
§ 371 (c)(1),
(2) Date: Jul. 18, 2017

(87) PCT Pub. No.: WO2016/118449
PCT Pub. Date: Jul. 28, 2016

(65) Prior Publication Data
US 2018/0264759 A1 Sep. 20, 2018

Related U.S. Application Data

(60) Provisional application No. 62/105,492, filed on Jan. 20, 2015.

(51) Int. Cl.
*B29C 73/00* (2006.01)
*B32B 43/00* (2006.01)
(Continued)

(52) U.S. Cl.
CPC .......... *B29C 73/10* (2013.01); *B29C 35/0805* (2013.01); *B64F 5/00* (2013.01);
(Continued)

(58) Field of Classification Search
CPC ....... B29C 70/00; B29C 70/68; B29C 70/683; B29C 73/00; B29C 73/04; B29C 73/10;
(Continued)

(56) References Cited

U.S. PATENT DOCUMENTS 4,824,631 A * 4/1989 Yeager ................. B29C 33/405
156/264
5,252,279 A 10/1993 Gore et al.
(Continued)

FOREIGN PATENT DOCUMENTS

DE 102013003669 A1 3/2014
EP 2364248 9/2011

OTHER PUBLICATIONS

International Search Report for International Application No. PCT/US2016/013791; dated Mar. 16, 2016; 9 pages.
(Continued)

*Primary Examiner* — Philip C Tucker
*Assistant Examiner* — Brian R Slawski
(74) *Attorney, Agent, or Firm* — Cantor Colburn LLP

(57) ABSTRACT

A method of repairing a contoured structure is provided. The method includes forming and curing on the contoured structure an armature formed of materials that are curable at a temperature lower than a service limit temperature of materials of the contoured structure and removing the armature from the contoured structure and placing the armature with prepregs laminated thereon in an oven to heat cure the armature and the prepregs to form a repair patch.

9 Claims, 3 Drawing Sheets

(51) Int. Cl.
| | |
|---|---|
| B29C 51/16 | (2006.01) |
| B29C 47/00 | (2006.01) |
| B29C 65/00 | (2006.01) |
| B32B 37/00 | (2006.01) |
| B32B 38/04 | (2006.01) |
| C08J 5/00 | (2006.01) |
| B29C 33/40 | (2006.01) |
| B27N 3/10 | (2006.01) |
| B29C 45/14 | (2006.01) |
| B29B 17/00 | (2006.01) |
| B29C 71/00 | (2006.01) |
| B29C 73/10 | (2006.01) |
| B64F 5/00 | (2017.01) |
| B64F 5/40 | (2017.01) |
| B29C 35/08 | (2006.01) |
| B29C 70/68 | (2006.01) |
| B29C 65/48 | (2006.01) |
| B29C 73/34 | (2006.01) |

(52) U.S. Cl.
CPC ............. *B64F 5/40* (2017.01); *B29C 65/483* (2013.01); *B29C 66/7212* (2013.01); *B29C 70/683* (2013.01); *B29C 73/34* (2013.01); *B29C 2035/0827* (2013.01)

(58) Field of Classification Search
CPC ..... B29C 65/48; B29C 65/483; B29C 66/721; B29C 66/7212; B29C 2791/001
USPC ............. 156/60, 94, 98, 196, 212, 242, 245, 156/272.2, 273.3, 275.5, 285, 286, 289, 156/307.1; 264/36.1, 36.22, 219, 220, 264/239, 241, 257, 299, 319, 330, 331.11, 264/331.12, 347
See application file for complete search history.

(56) References Cited

U.S. PATENT DOCUMENTS

| | | | | |
|---|---|---|---|---|
| 5,374,388 | A * | 12/1994 | Frailey | ................ B29C 33/3821 156/285 |
| 5,876,546 | A * | 3/1999 | Cloud | .................... B29C 35/02 156/212 |
| 2007/0196635 | A1* | 8/2007 | Krogager | .............. B29C 33/448 428/292.1 |
| 2014/0299255 | A1 | 10/2014 | Whitworth et al. | |

OTHER PUBLICATIONS

Written Opinion of the International Search Report for International Application No. PCT/US2016/013791; dated Mar. 16, 2016; 5 pages.
Supplementary European Search Report; EP 16740552; dated Oct. 11, 2018; 8 pages.

* cited by examiner

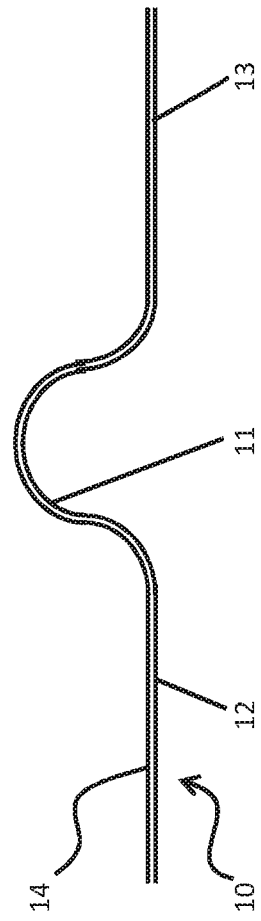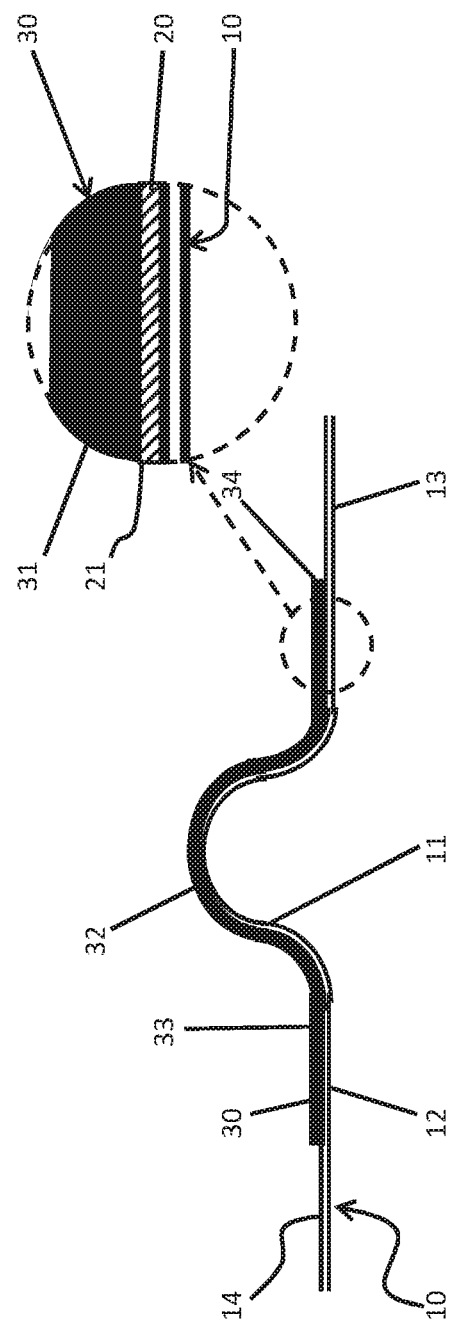

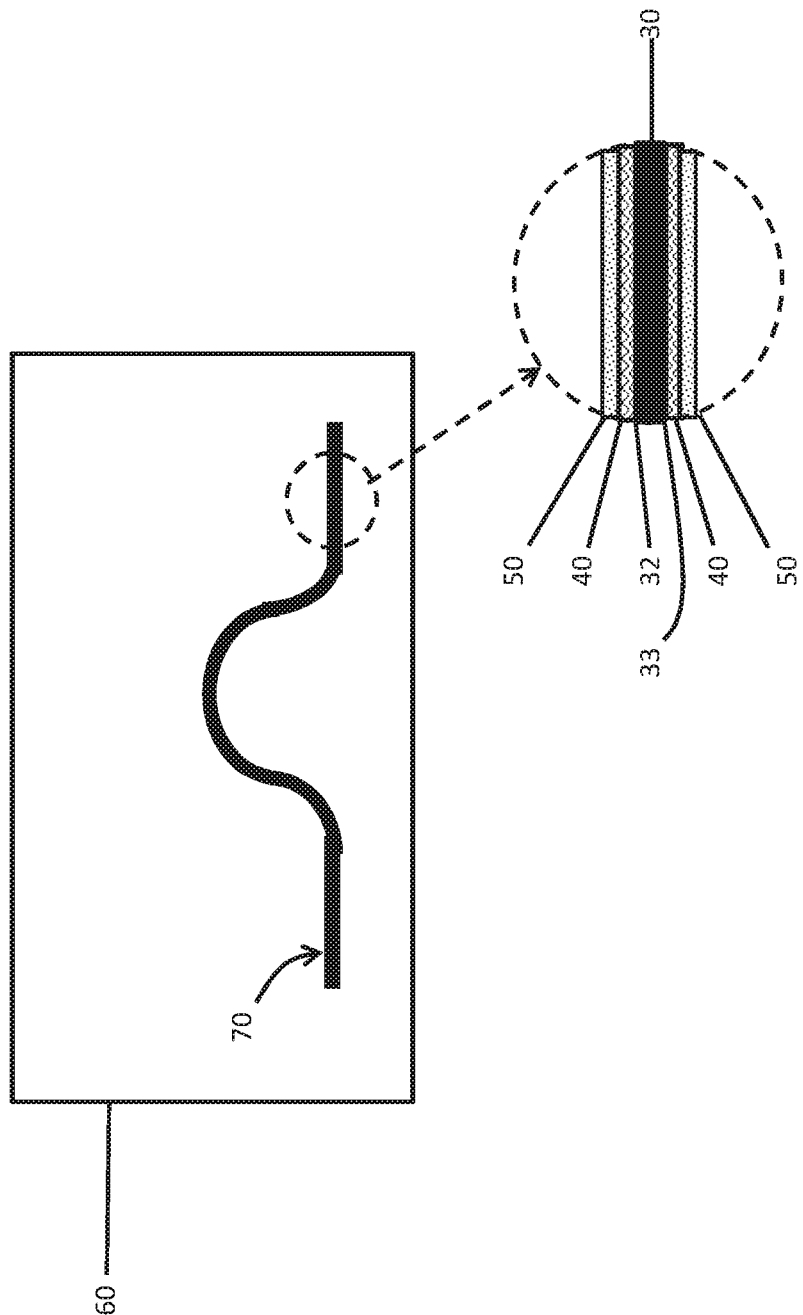

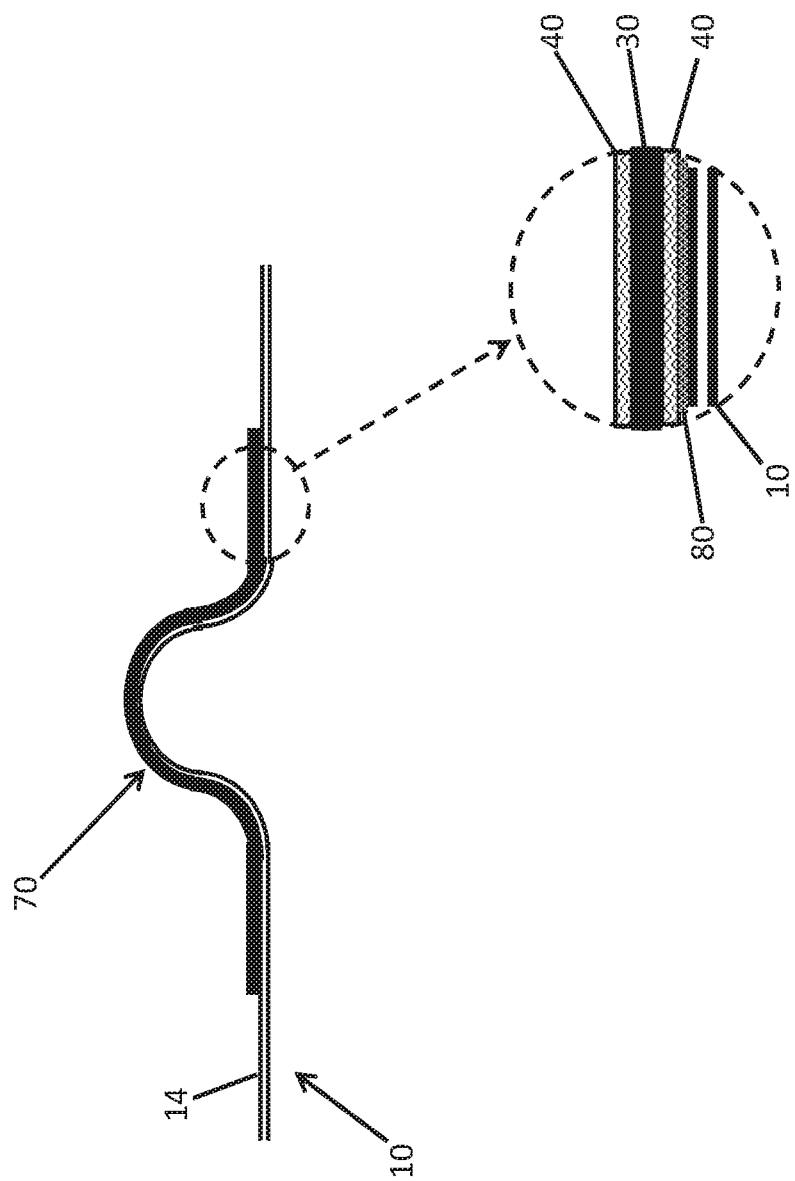

COMPOSITE REPAIR ARMATURE

CROSS REFERENCE TO RELATED APPLICATIONS

This application is a National Stage application of PCT/US2016/013791, filed Jan. 18, 2016, which claims the benefit of U.S. Provisional Application No. 62/105,492, filed Jan. 20, 2015, both of which are incorporated by reference in their entirety herein.

BACKGROUND OF THE INVENTION

The subject matter disclosed herein relates to a repair armature and, more particularly, to an ultraviolet (UV) curable composite repair armature.

In various technological applications, such as helicopter repair and maintenance, the repair of composite structures often involves bonding a laminate patch over a damaged area. In some cases, the contour of the structure to be repaired is simple enough to allow a generic precured laminate patch to be used. However, this is not always the case and more complex parts often require that the patch be laid up as a prepreg or wet layup directly on the structure to conform to the contour.

Normally, for repair of complex structures, resin systems are used that cure at reduced or room temperatures to facilitate a cure in place without compromising the base structure or surrounding systems. The material systems that enable this approach have limited mechanical properties though. This results in the repairs being inefficient and in some cases impractical due to the amount of material needed to meet structural requirements.

BRIEF DESCRIPTION OF THE INVENTION

According to one aspect of the invention, a method of repairing a contoured structure is provided. The method includes forming and curing on the contoured structure an armature formed of materials that are curable at a temperature lower than the service limit temperature of the materials of the contoured structure and removing the armature from the contoured structure and placing the armature with prepregs laminated thereon in an oven to heat cure the armature and the prepregs to form a repair patch.

In accordance with additional or alternative embodiments, the method further includes adhering the repair patch to the contoured structure.

In accordance with additional or alternative embodiments, the adhering includes interposing curing paste adhesive between the repair patch and the contoured structure.

In accordance with additional or alternative embodiments, the method further includes disposing on the contoured structure a release ply on which the armature is formed.

In accordance with additional or alternative embodiments, the armature includes epoxy.

In accordance with additional or alternative embodiments, the armature includes a fiberglass laminate with an ultraviolet (UV) curing resin system.

In accordance with additional or alternative embodiments, the method further includes laminating the prepregs onto one side of the armature.

In accordance with additional or alternative embodiments, the prepregs include materials that are curable at a temperature higher than the temperature at which the materials of the contoured structure are subject to during normal thermal excursions.

In accordance with additional or alternative embodiments, the prepregs include carbon fiber prepregs.

In accordance with additional or alternative embodiments, the method further includes envelop bagging the armature and the prepregs in the oven to consolidate the laminate during cure.

According to another aspect of the invention, a repair patch for a contoured structure is provided. The repair patch includes an armature formed to match a contour of the contoured structure and of materials that are curable at a temperature lower than a service limit temperature of materials of the contoured structure and prepregs laminated onto opposite sides of the armature. The prepgregs include materials that are curable at a temperature higher than the service limit temperature of the materials of the contoured structure.

In accordance with additional or alternative embodiments, the contoured structure includes an aircraft component.

In accordance with additional or alternative embodiments, the repair further includes curing paste adhesive by which the repair patch is adhered to the contoured structure.

In accordance with additional or alternative embodiments, the armature includes a fiberglass laminate with an ultraviolet (UV) curing resin system.

In accordance with additional or alternative embodiments, the prepregs include carbon fiber prepregs.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is an elevational view of a damaged part to be repaired;

FIG. 2 is an elevational view of an armature cured directly on the damaged part of FIG. 1;

FIG. 3 is a schematic diagram illustrating the armature and prepregs laminated on the armature in an oven to form a repair patch; and FIG. 4 is an elevational view of the damaged part of FIG. 1 and the repair patch of FIG. 3.

The detailed description explains embodiments of the invention, together with advantages and features, by way of example with reference to the drawings.

DETAILED DESCRIPTION OF THE INVENTION

As described below, a repair approach is proposed to allow for patches to be made using 350 degree cure, high performance materials through a process that involves material curing in an oven and off the structure being repaired. The process includes fabrication of an armature that is cured in place on the structure with an intermediate release ply to match the required contour of the part. The armature is made using a fiberglass laminate with an ultraviolet (UV) curing resin system that can be quickly cured at room temperature when exposed to UV light. The armature is then removed and serves as the basis for a structural patch to be laid up upon it and envelop bagged for curing. Finally, the cured and contoured patch is bonded to the repair site using a room temperature solidifying adhesive.

With reference to FIGS. 1-4, a method of repairing a contoured structure 10 is provided. The contoured structure 10 may include a damaged site and may be, for example, an aircraft component or a portion of an aircraft outer skin. The contoured structure 10 may be formed of composite structures that can be sensitive to and damaged by exposures to high temperatures such as those used to cure high performance materials. As shown in FIG. 1, the contoured structure 10 can be flat or at least partially curved with curved portions 11 interposed between first and second flat portions 12 and 13. However, it is to be understood that no flat portions are required and that the contoured structure 10 can be in any arbitrary form. That is, while the illustration of FIG. 1 is indicative of a process, it should not imply a constraint on the repair method.

As shown in FIG. 2, the method includes disposing a release ply 20 on an outer surface 14 (see FIG. 1) of the contoured structure 10 and then disposing materials 31 for forming an armature 30 on an outer surface 21 of the release ply 20. The release ply 20 may have a thickness of about 5 mils and is provided to permit an easy release of the armature 30 from the contoured structure 10. The materials 31 are moldable to mimic a shape of the contoured structure 10 such that, in the case of FIG. 1, the resulting armature 30 includes curved portions 32 interposed between first and second flat portions 33 and 34 where the curved portions 32 correspond to the curved portions 11 of the contoured structure 10 and the first and second flat portions 33 and 34 correspond to the first and second flat portions 12 and 13 of the contoured structure 10.

In accordance with embodiments, the materials 31 include epoxy and/or are formed of a fiberglass laminate with an ultraviolet (UV) curing resin system. In any case, the materials 31 can be cured at a relatively low temperature, which is at least lower than a service limit temperature of materials of the contoured structure 10 (the service limit temperature may be defined as a temperature or range of temperatures the materials of the contoured structure 10 are or would be subject to during normal thermal excursions). Thus, the armature 30 can be formed on the contoured structure 10 without damaging or further damaging the contoured structure 10.

Once the armature 30 is formed and cured, the armature 30 is removed or released from the contoured structure 10 and the release ply 20. At this point, as shown in FIG. 3, prepregs 40 are laminated onto at least one or both of one sides 32, 33 of the armature 30 and then the armature 30 and the prepregs 40 are envelope bagged within an envelope bag 50 for consolidation. The enveloped armature 30 and prepregs 40 are then placed in an autoclave or oven 60 such that the prepregs 40 can be heat cured. This heat curing forms the armature 30 and the prepregs 40 into a repair patch 70 and may be executed at or around about 350 degrees Fahrenheit as an example. More generally, the heat curing is executed at or well above the curing temperature of the materials 31 and the temperature at which the materials 31 of the contoured structure 10 are or would be subject to during normal thermal excursions.

In accordance with embodiments, the prepregs 40 include materials that are curable at a temperature higher than the temperature at which the materials 31 of the contoured structure 10 are subject to during normal thermal excursions. In particular, the prepregs 40 may be formed of carbon fiber. In any case, since the prepregs 40 are curable at the relatively high temperature, they can be formed of high performance materials that are capable of handling the loads experienced by the contoured structure 10. However, since the prepregs 40 are cured on the armature 30 in the autoclave or oven 60 and not on the contoured structure 10, the contoured structure 10 is not exposed to the high heat required for the curing of the prepregs 40. Thus, the repair patch 70 can be formed as a high performance component without causing thermal excursions or heat damage to the contoured structure 10.

As shown in FIG. 4, once the prepregs 40 are cured and the repair patch 70 is formed, the repair patch 70 is adhered to the outer surface 14 of the contoured structure 10. The adhering is achieved by interposing curing paste adhesive 80 between the repair patch 70 and the outer surface 14 of the contoured structure 10. The adhesive 80 cures at a temperature similar to the curing temperature of the materials 31 of the armature 30 and, as such, the adhering does not lead to thermal excursions or heat damage to the contoured structure 10. In addition, a thickness of the adhesive 80 may be similar to the thickness of the release ply 20 to insure a close fit of the repair patch 70 and the outer surface 14.

The described processes noted above provide for establishment of a repair patch that conforms to an exact local contour of a part to be repaired without thermal excursion of the part. In doing so, the processes facilitate execution of repairs using high performance materials that require high temperature curing. The processes are applicable to all composite structures with complex contours, which would require in situ repairs but could otherwise be compromised by local thermal excursions. This spans many industrial sectors, including future automotive applications among others.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of repairing a contoured structure, the method comprising:
    forming and curing on the contoured structure an armature formed of materials that are curable at a temperature lower than a service limit temperature of materials of the contoured structure;
    removing the armature from the contoured structure and placing the armature with prepregs laminated thereon in an oven to heat cure the armature and the prepregs to form a repair patch; and adhering the repair patch to the contoured structure.

2. The method according to claim 1, wherein the adhering comprises interposing a curing paste adhesive between the repair patch and the contoured structure.

3. The method according to claim 1, further comprising disposing on the contoured structure a release ply on which the armature is formed.

4. The method according to claim 1, wherein the armature comprises epoxy.

5. The method according to claim 1, wherein the armature comprises a fiberglass laminate with an ultraviolet (UV) curing resin system.

6. The method according to claim 1, further comprising laminating the prepregs onto one side of the armature.

7. The method according to claim 1, wherein the prepregs comprise materials that are curable at a temperature higher than a temperature at which the materials of the contoured structure are subject to during normal thermal excursions.

8. The method according to claim 1, wherein the prepregs comprise carbon fiber prepregs.

9. The method according to claim 1, further comprising envelope bagging the armature and the prepregs in the oven to consolidate the armature and the prepregs during cure.

\* \* \* \* \*